US012687951B2

(12) United States Patent
Chen et al.

(10) Patent No.: US 12,687,951 B2
(45) Date of Patent: Jul. 21, 2026

(54) TOUCH SENSING SYSTEM AND CONTROL METHOD THEREOF

(71) Applicant: ELAN MICROELECTRONICS CORPORATION, Hsin-Chu (TW)

(72) Inventors: Po-An Chen, Taoyuan City (TW);
Han-Wei Chen, Taipei City (TW);
Chia-Hsing Lin, Hsinchu City (TW);
Yi-Hsin Tao, Hsinchu City (TW)

(73) Assignee: ELAN MICROELECTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 19/092,093

(22) Filed: Mar. 27, 2025

(65) Prior Publication Data

US 2025/0306717 A1      Oct. 2, 2025

Related U.S. Application Data

(60) Provisional application No. 63/653,201, filed on May 29, 2024, provisional application No. 63/573,452, filed on Apr. 2, 2024.

(30) Foreign Application Priority Data

Jan. 24, 2025     (TW) ................................. 114103482

(51) Int. Cl.
*G06F 3/041*          (2006.01)
*G06F 3/044*          (2006.01)
(52) U.S. Cl.
CPC ...... *G06F 3/04186* (2019.05); *G06F 3/04166* (2019.05); *G06F 3/0446* (2019.05)

(58) Field of Classification Search
None
See application file for complete search history.

(56)                References Cited

U.S. PATENT DOCUMENTS

| | | | | |
|---|---|---|---|---|
| 10,824,270 | B1 * | 11/2020 | Wang | .................... G06F 3/0418 |
| 11,928,289 | B2 * | 3/2024 | Chen | ...................... G06F 3/044 |
| 2010/0045635 | A1 * | 2/2010 | Soo | ........................ G06F 3/0412 |
| | | | | 345/173 |
| 2014/0285444 | A1 * | 9/2014 | Hermes | ................. G06F 3/0446 |
| | | | | 345/173 |
| 2016/0240163 | A1 * | 8/2016 | Yamamoto | ............ G06F 3/0446 |
| 2019/0042016 | A1 * | 2/2019 | Wang | .................... G06F 3/0443 |
| 2019/0324640 | A1 * | 10/2019 | Park | ................... G06V 40/1306 |
| 2020/0249791 | A1 * | 8/2020 | Kim | .................... G06F 3/04162 |
| 2023/0266844 | A1 | 8/2023 | Lee et al. | |

FOREIGN PATENT DOCUMENTS

TW           201624250 A      7/2016

OTHER PUBLICATIONS

Taiwan Patent Application has received its examination report dated Feb. 26, 2026 for Application No. 114103482; pp. 1-19.

* cited by examiner

*Primary Examiner* — Krishna P Neupane
(74) *Attorney, Agent, or Firm* — MUNCY, GEISSLER, OLDS & LOWE, P.C.

(57)                ABSTRACT
A touch sensing system includes a capacitive touch panel, a controller, and a signal source. The capacitive touch panel is used for a user to perform inputs. The controller is coupled to the capacitive touch panel, configured to scan the capacitive touch panel. The signal source is configured to provide a periodical signal for coupling to the user, such that the periodical signal can be coupled to the capacitive touch panel via the user.

26 Claims, 8 Drawing Sheets

50

53 signal source

522

524

52 controller

51 capacitive touch panel

TOUCH SENSING SYSTEM AND CONTROL METHOD THEREOF

This application claims priority to U.S. Provisional Patent Application No. 63/573,452, filed on Apr. 2, 2024; U.S. Provisional Patent Application No. 63/653,201, filed on May 29, 2024; and Taiwan (R.O.C.) patent application No. 114103482, filed on Jan. 24, 2025, the contents of which are incorporated by reference in their entirety.

BACKGROUND OF THE INVENTION

Field of the Invention

The present invention relates to a touch sensing system, particularly to a touch sensing system for improving liquid interference and a control method thereof.

Description of the Prior Art

A capacitive touch panel is usually used as an input device in an electronic device, whereby the user may use it to input characters or gestures. However, if there is liquid, such as water or saline, on the touch panel, it may lead to abnormal operation.

SUMMARY OF THE INVENTION

One objective of the present invention is to provide a touch sensing system for improving liquid interference and a control method thereof.

According to one embodiment, the present invention provides a touch sensing system, which comprises a capacitive touch panel, a controller, and a signal source. The capacitive touch panel is used for a user to perform inputs and has a plurality of electrodes. The controller is coupled to the capacitive touch panel, configured to scan the plurality of electrodes to generate touch sensing information. The signal source is configured to provide a periodical signal for coupling to the user, such that the periodical signal can be coupled to the capacitive touch panel via the user.

According to one embodiment, the present invention provides a touch sensing system, which comprises a capacitive touch panel, a controller, and a signal source. The capacitive touch panel is used for user to perform inputs. The controller is coupled to the capacitive touch panel, configured to scan the capacitive touch panel to generate touch sensing information. The controller includes a high-voltage terminal and a low-voltage terminal. A combination of the high-voltage terminal and the low-voltage terminal is configured to provide power to the controller. The signal source is configured to provide a periodical signal to the high-voltage terminal or to both the high-voltage terminal and the low-voltage terminal.

According to one embodiment, the present invention provides a control method of a touch sensing system. The touch sensing system comprises a capacitive touch panel, a controller, and a signal source. The controller is coupled to the capacitive touch panel and includes a high-voltage terminal and a low-voltage terminal. A combination of the high-voltage terminal and the low-voltage terminal is configured to provide power to the controller. The control method comprises A: providing a periodical signal to the high-voltage terminal of the controller or to both the high-voltage terminal and the low-voltage terminal of the controller; and B: using the controller to scan the capacitive touch panel to generate a touch sensing information.

The present invention is characterized in using a signal source to provide a high-frequency periodical signal to overcome the liquid-induced interference on a touch sensing system.

DETAILED DESCRIPTION OF THE INVENTION

Figure 1:
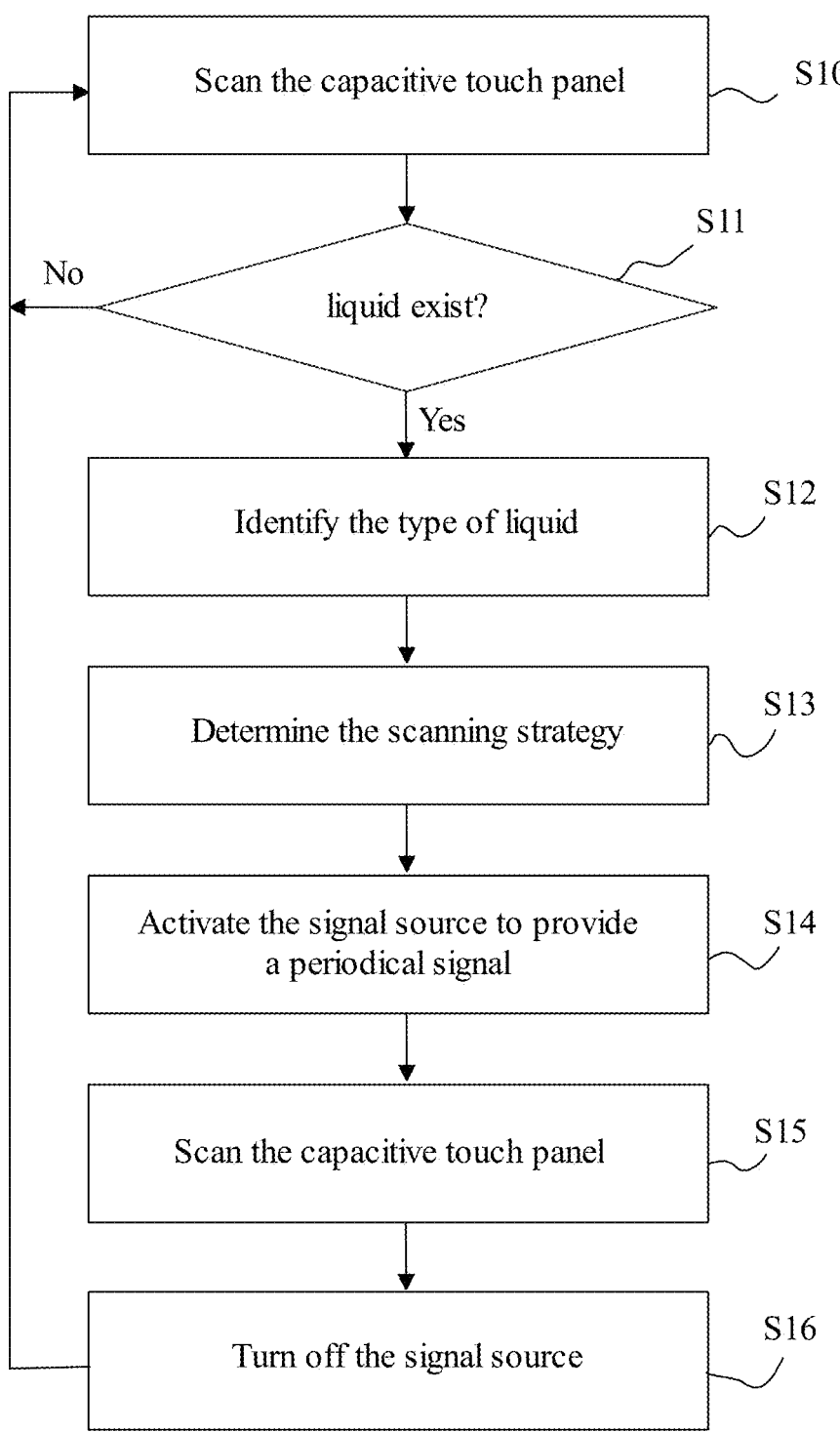
FIG. 1 shows an embodiment of a control method for a touch sensing system of the present invention.
Figure 2:
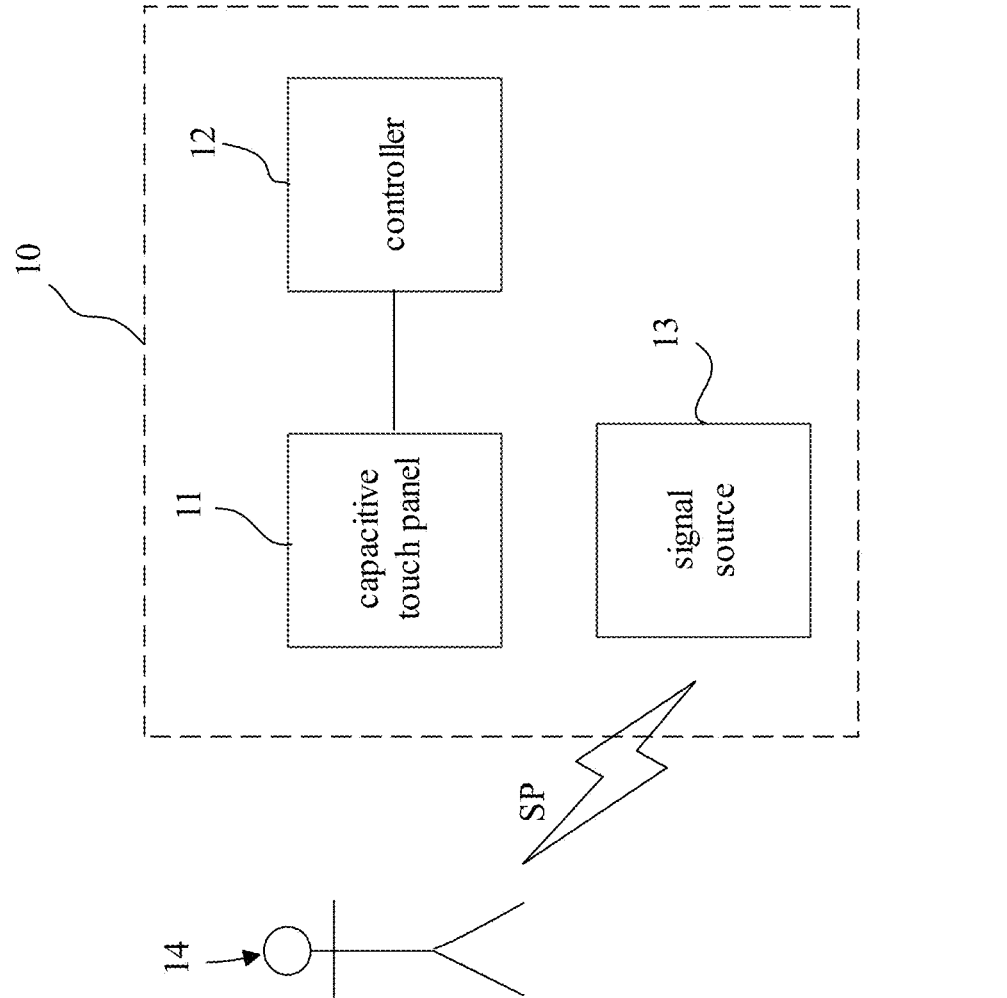
FIG. 2 shows a first embodiment of a touching sensing system of the present invention.

FIG. 1 shows an embodiment of a control method for a touch sensing system of the present invention. FIG. 2 shows a first embodiment of a touch sensing system of the present invention, which can be used to implement the control method shown in FIG. 1. In FIG. 2, the touch sensing system 10 comprises a capacitive touch panel 11, a controller 12, and a signal source 13. The capacitive touch panel 11 is used for user 14 to perform inputs. In one embodiment, the capacitive touch panel 11 includes m electrodes in a X direction and n electrodes in a Y direction. The X direction is perpendicular to the Y direction. The intersections of the m electrodes and the n electrodes form m*n sensing points. The controller 12 is connected to the capacitive touch panel 11 and is used to scan the capacitive touch panel 11 to generate a touch sensing information. The touch sensing information includes, for example, the sensing values of the m*n sensing points. The signal source 13 is configured to provide a periodical signal Sp for coupling to the user 14, such that the periodical signal Sp can be coupled to the capacitive touch panel 11 via the user 14. In one embodiment, the controller 12 may be coupled to the signal source 13 through a wired or wireless means. While there is liquid present on a surface of the capacitive touch panel 11, the controller 13 activates the signal source 13 to output the periodical signal Sp.

Figure 3:
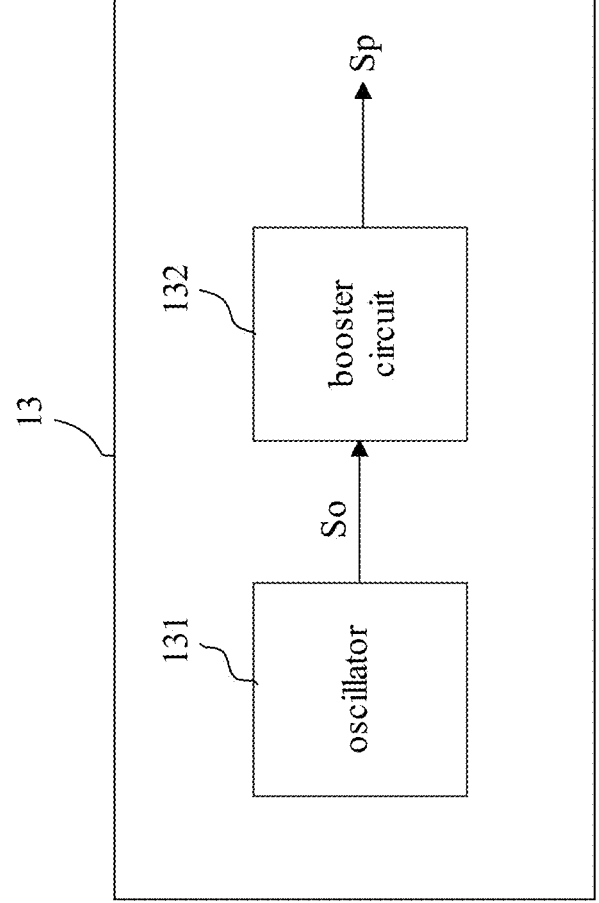
FIG. 3 shows an embodiment of the signal source shown in FIG. 2.

FIG. 3 shows an embodiment of the signal source shown in FIG. 2. In the embodiment of FIG. 3, the signal source 13 includes an oscillator 131 and a booster circuit 132. The oscillator 131 is connected to the booster circuit 132. The oscillator 131 is used to generate an oscillation signal So. The booster circuit 132 is used to boost the oscillation signal So to generate the periodical signal Sp.

The following describes each step of FIG. 1. Please also refer to the embodiment shown in FIG. 2. In the step S10, the controller 12 scans the capacitive touch panel 11 to generate first touch sensing information. The first touch sensing information includes the sensing values of the plurality of electrodes of the capacitive touch panel 11. The scanning performed in the step S10 includes, but is not limited to, the mutual-capacitance scanning. For example, the controller 12 sequentially applies driving signals to the m electrodes of the capacitive touch panel 11 in the X direction and senses the n electrodes in the Y direction to obtain m*n sensing signals. Next, in the step S11, it is determined whether there is liquid present on the capacitive touch panel 11 according to the first sensing information obtained in the step S10. If the step S11 determines that there is no liquid on the capacitive touch panel 11, the process returns to the step S10 to scan the capacitive touch panel 11. If the step S11 determines that there is liquid on the capacitive touch panel 11, the process proceeds to the step S12. In the existing technology, there are already numerous methods for determining whether there is liquid on the capacitive touch panel 11, so it will not be elaborated further here.

Step S12 further determines the type of liquid 21, for example, is water or saline. In one embodiment, based on the conductivity of water is different from the conductivity of saline, the liquid 21 is water or saline may be determined by scanning the capacitive touch panel 11 with signals of different frequencies. For example, the controller 12 first provides a driving signal having a first frequency to perform a first mutual-capacitance scan on the capacitive touch panel 11, generating first mutual-capacitance sensing information. Then, the controller 12 provides a driving signal having a second frequency to perform a second mutual-capacitance scan on the capacitive touch panel 11, generating second mutual-capacitance sensing information, wherein the second frequency is different from the first frequency. The controller 12 can determine whether the liquid 21 is water or saline according to the first mutual-capacitance sensing information and the second mutual-capacitance sensing information. When water is present on the capacitive touch panel 11, scanning the capacitive touch panel 11 with a low-frequency driving signal can detect the presence of water. However, when scanning with a high-frequency driving signal, the water will not be detected. In contrast, when saline is present on the capacitive touch panel 11, it can be detected by scanning the capacitive touch panel 11 with both low-frequency and high-frequency driving signals. Therefore, the controller 12 can determine whether the liquid 21 is water or saline according to the first mutual-capacitance sensing information and the second mutual-capacitance sensing information. In one embodiment, the first frequency ranges from 100 KHz to 200 KHz, and the second frequency ranges from 500 KHz to 700 KHz, but the present invention is not limited to these values. In the abovementioned embodiment, the determination of whether the liquid 21 is water or saline is used as an example, but the present invention is not limited to this. The controller 12 can apply driving signals of different frequencies to scan the capacitive touch panel 11 and identify different liquids according to the scanning results.

After identifying the type of the liquid 21, the step S13 is executed. In step S13, a scanning strategy is determined according to the type of the liquid 21. Different scanning strategies use different frequencies of periodical signals Sp. In one embodiment, in addition to the frequency of the periodic signal Sp is different, the parameters used by the algorithm also differ across different scanning strategies. The algorithm is used to calculate the sensing values or the contact positions.

After determining the scanning strategy, the step S14 is executed. In step S14, the signal source 13 is activated to provide a periodical signal Sp according to the scanning strategy determined in the step S13. The frequency of the periodical signal Sp is determined according to the scanning strategy determined in the step S13. For example, the step S13 determines the use of a first scanning strategy based on the liquid 21 being water. According to the first strategy, the frequency of the periodical signal Sp in the step 14 is set to 1.2 MHz to 2 MHz. Alternatively, the step S13 determines the use of the second scanning strategy based on the liquid 21 being saline. According to the second strategy, the frequency of the periodical signal Sp in the step 14 is set to 10 MHz to 100 MHz. In one embodiment, the controller 12 is coupled to the signal source 13. The controller executes the steps S11 to S14 and controls the signal source 13 to generate the periodical signal Sp.

Figure 4:
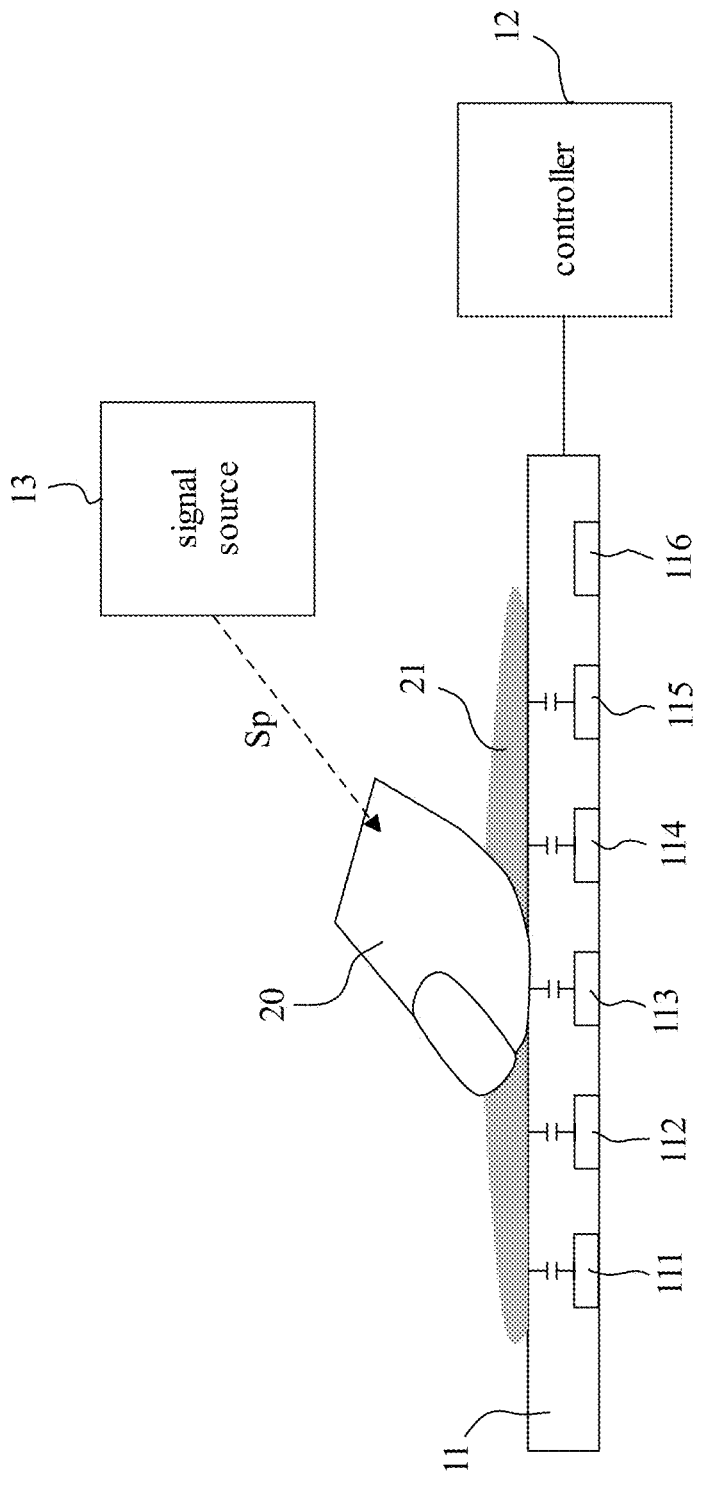
FIG. 4 is a diagram schematically showing an embodiment where there is liquid on the capacitive touch panel shown in FIG. 2.

After activating the signal source 13 to provide the periodical signal Sp, the step S15 is executed. In the step S15, the controller 12 scans the capacitive touch panel 11 to generate second touch sensing information. The second touch sensing information includes a plurality of sensing values of the plurality of electrodes of the capacitive touch panel 11. The scanning performed in the step S15 does not apply a driving signal to the capacitive touch panel 11, but only detects all the electrodes of the capacitive touch panel 11. Referring to FIG. 4, during the scanning process of the step S15, the periodical signal Sp provided by the signal source 13 is coupled to the user, such that the periodical signal Sp is further coupled to the capacitive touch panel 11 via the finger 20 of the user. At this moment, the finger 20 of the user functions as an active stylus that emits signals. As mentioned above, the frequency of the periodical signal Sp is determined according to the type of the liquid 21. While the finger 20 of the user contact with both the capacitive touch panel 11 and the liquid 21, the periodical signal Sp cannot pass through the liquid 21 to reach the capacitive touch panel 11. Instead, the periodical signal Sp is only be coupled to an electrode 113 at the contact position of the finger 20 on the capacitive touch panel 11. Thus, the sensing value of the electrode 113 is greater than the sensing values of other electrodes 111, 112, 114, 115, and 116. Therefore, the touch sensing system 10 can precisely determine the contact position of the finger 20 according to the second touch sensing information without being affected by the liquid 21.

While the activating duration of the signal source 13 reaches a preset value or the number of scans of the capacitive touch panel 11 reaches a preset value, t the step S16 is executed to turn off the signal source 13, and then the process returns to the step S10.

Figure 5:
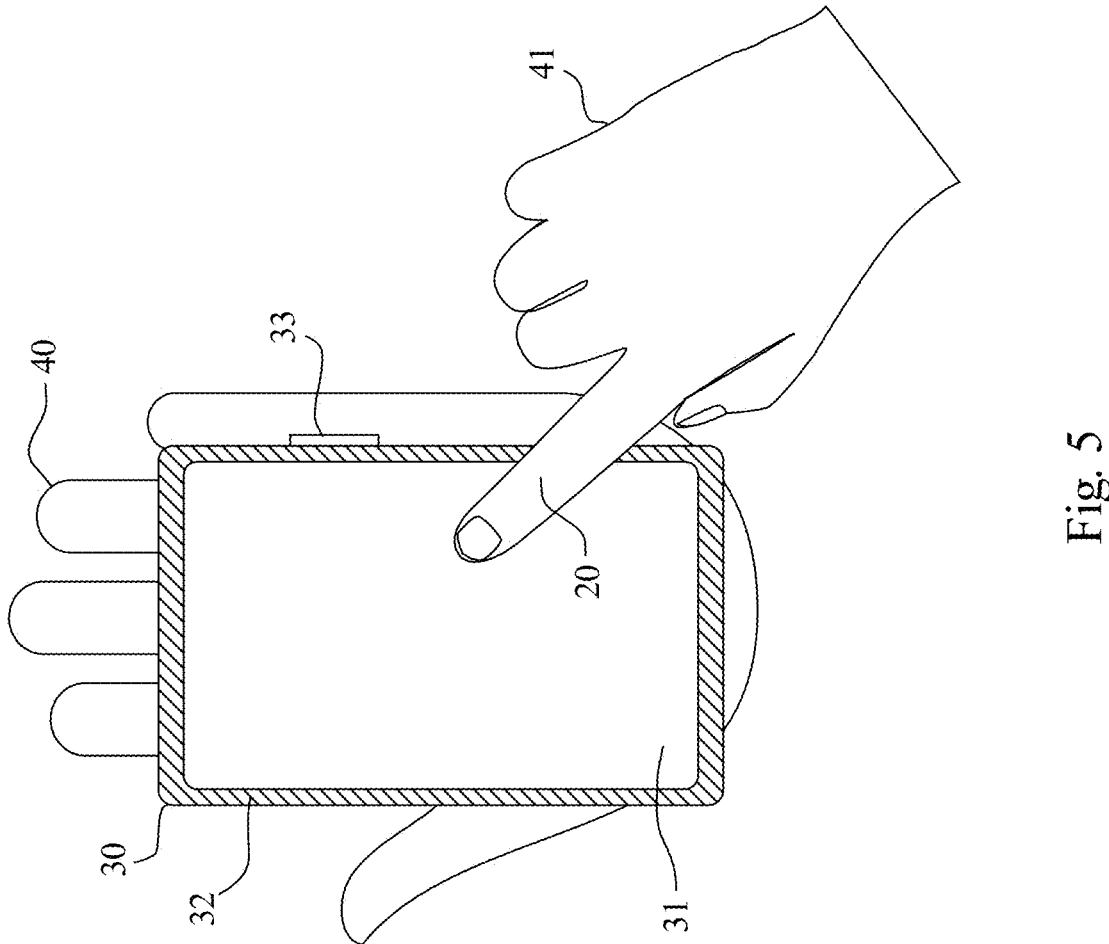
FIG. 5 is a diagram schematically showing an embodiment where the touch sensing system of the present invention is applied to a smart phone.

In one embodiment, the touch sensing system 10 further comprises a conductor connected to the signal source 13. The conductor is used for user contact, such that the periodical signal Sp from the signal source 13 can be coupled to the user through the conductor. FIG. 5 shows an embodiment where the periodical signal SP from the signal source is coupled to the user. In FIG. 5, the touch sensing system 10 of the present invention is applied to a smartphone 30. The smartphone 30 includes a touch screen 31, a metal frame 32, a metal button 33, and a metal back cover (not shown in the drawing). The touch screen 31 includes the capacitive touch panel 11 of the touch sensing system 10. The controller 12 and the signal source 13 of the touch sensing system 10 are arranged within the casing of the smartphone 30. The signal source 13 is connected to the metal frame 32, the metal button 33 and/or the metal back cover. In this embodiment, the metal frame 32, the metal button 33 and/or the metal back cover serve as the conductor connected to the signal source 13. While the user holds the smartphone 30 with his left hand 40 and operates the touchscreen 31 with a finger 20 of his right hand 41, the periodical signal Sp from the signal source 13 can be transmitted through the left hand 40, which is in contact with the metal frame 32, the metal button 33 and/or the metal back cover, to the finger 20 of the right hand 41.

Figure 6:
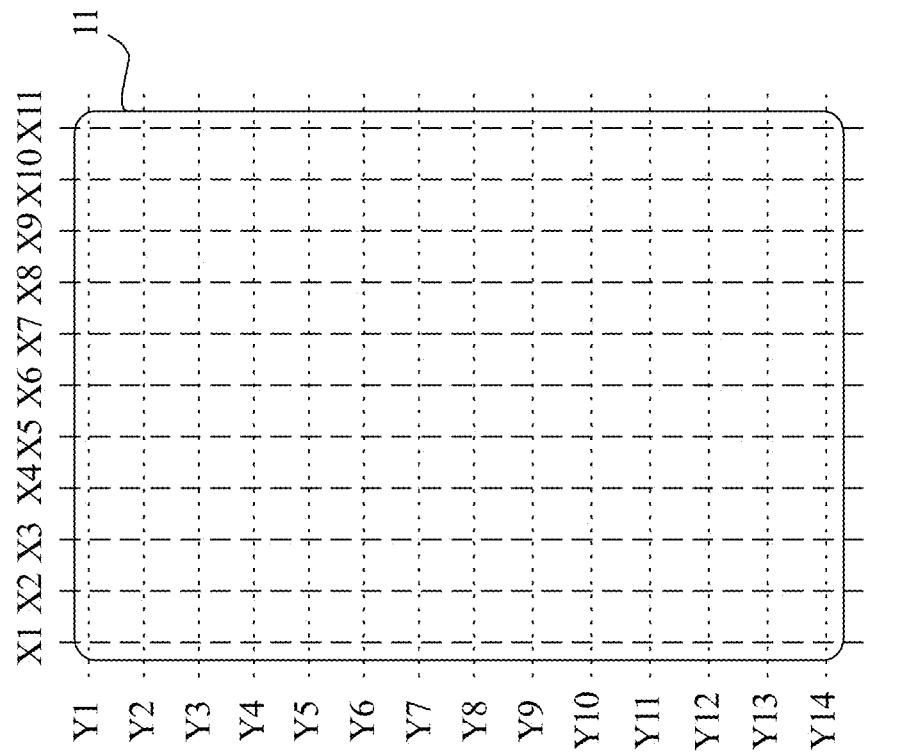
FIG. 6 is a diagram schematically showing an embodiment of a capacitive touch panel of the present invention.

In one embodiment, the touch sensing system 10 further comprises an antenna connected to the signal source 13. The antenna is used to couple the periodical signal Sp to the user. The antenna may be, for example, a near field communication (NFC) circuit of the smartphone 30, the electrodes of the capacitive touch panel 11, or other antennas capable of transmitting signals. The signal source 13 can be connected to the NFC circuit, the electrodes of the capacitive touch panel 11 and/or the antenna to transmit the periodical signal Sp to the user. FIG. 6 shows an embodiment where the electrodes of the capacitive touch panel 11 are used as the antenna connected to the signal source 13. In FIG. 6, the capacitive touch panel 11 includes a plurality of electrodes X1 to X11 arranged along the horizontal direction (X direction) and a plurality of electrodes Y1 to Y14 arranged along the vertical direction (Y direction), wherein the electrodes X1 to X11 are perpendicular to the electrodes Y1 to Y14. The electrode X1 is located in the left edge region of the capacitive touch panel 11. The electrode X11 is located in the right edge region of the capacitive touch panel 11. The electrode Y1 is located in the upper edge region of the capacitive touch panel 11. The electrode Y14 is located in the lower edge region of the capacitive touch panel 11. The left edge region is adjacent to both the upper and lower edge regions. The right edge region is also adjacent to both the upper and lower edge regions. While executing the step S14 and the step S15 in FIG. 3, the signal source 13 can transmit the periodical signal Sp to the user through the electrodes of the capacitive touch panel 11. Specifically, in a first time interval, the signal source 13 is connected to the electrode X1 and/or the electrode X11 to transmit the periodical signal Sp to the user through the electrode X1 and/or the electrode X11. Meanwhile, the touch sensing system 10 acquires the sensing values of the electrodes X2 to X10, which are not connected to the signal source 13. In a second time interval, the signal source 13 is connected to the electrode Y1 and/or the electrode Y14 to transmit the periodical signal Sp to the user through the electrode Y1 and/or the electrode Y14. Meanwhile, the touch sensing system 10 acquires the sensing values of the electrodes Y2 to Y13, which are not connected to the signal source 13.

In one embodiment, the signal source 13 may be arranged on a different electronic device separately from the capacitive touch panel 11 and the controller 12. For example, the capacitive touch panel 11 and the controller 12 may be arranged in a smartphone, and the signal source 13 may be arranged in a wearable electronic device. The wearable electronic device may be, but is not limited to, a smartwatch, a headphone, or a ring. Specifically, the controller 12 may activate the signal source 13 in the smartwatch via the wireless communication module (such as the Bluetooth device) of the smartphone. The signal source 13 then provides the periodical signal Sp to the conductor in the smartwatch that is in contact with the skin of the user or transmits the periodical signal Sp to the user through the antenna of the smartwatch.

In one embodiment, the signal source 13 can transmit the periodical signal Sp through different elements in the electronic device. For example, in a laptop computer with a touchscreen and a touchpad, when the user operates the touchscreen, the signal source 13 can transmit the periodical signal Sp to the user via the electrodes of the touchpad. Conversely, when the user operates the touchpad, the signal source 13 can transmit the periodical signal Sp to the user via the electrodes of the touchscreen.

The entity executing the steps of FIG. 1 can have numerous variations and combinations, and is not limited to those embodiments in the specification. In one embodiment, the steps S11 to S14 are performed by the controller 12. In another embodiment, an electronic device (such as a smartphone) includes the capacitive touch panel 11 and the controller 12. The scanning results of the step S10 (including a plurality of sensing values detected from the capacitive touch panel 11) are sent to the host of the electronic device (such as CPU), which then performs the steps S11 to S14. In one embodiment, the controller 12 executes the steps S11 to S13 and transfers the determined scanning strategy or the contents of the scanning strategy (such as the frequency of the periodical signal Sp) to the aforementioned host, which then executes the step S14.

Figure 7:
FIG. 7 is a diagram schematically showing a second embodiment of a touching sensing system of the present invention.
Figure 7:
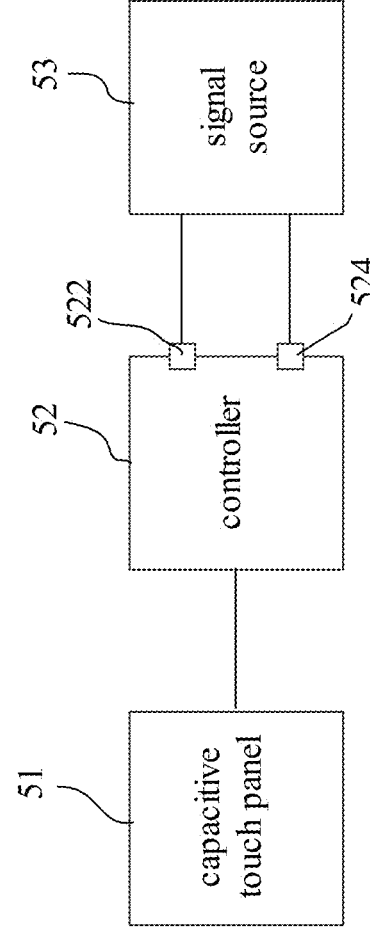

The method of FIG. 1 can also be implemented by the embodiment shown in FIG. 7. In FIG. 7, the touch sensing system 50 comprises a capacitive touch panel 51, a controller 52 and a signal source 53. The controller 52 is connected to the capacitive touch panel 51 and is used to scan the capacitive touch panel 51. The controller 52 has a high-voltage terminal 522 and a low-voltage terminal 524, wherein the combination of the high-voltage terminal 522 and the low-voltage terminal 524 is configured to supply power to the controller 52. In one embodiment, the low-voltage terminal 524 is a grounding terminal, and the high-voltage terminal 522 supplies a operating voltage VDD to the controller 52. The signal source 53 is connected to the controller 52 to provide a periodical signal Sp to both the high-voltage terminal 522 and the low-voltage terminal 524. Since the periodical signal Sp is applied to the high-voltage terminal 522 and the low-voltage terminal 524 simultaneously, the voltage difference between the high-voltage terminal 522 and the low-voltage terminal 524 remains unchanged. The composition of the capacitive touch panel 51 and the signal source 53 can be referenced in the previous description of the capacitive touch panel 11 and the signal source 13, and will not be elaborated here.

The operation of the system shown in FIG. 7 is explained below with reference to FIG. 1. In the step S10, the controller 52 scans the capacitive touch panel 51 to generate first touch sensing information. The first touch sensing information includes sensing values of a plurality of electrodes of the capacitive touch panel 51. The scanning performed in the step S10 includes, but is not limited to, the mutual-capacitance scanning. In the step S11, the controller 52 determines whether there is liquid on the capacitive touch panel 51 according to the first touch sensing information. If the controller 52 determines that there is no liquid on the capacitive touch panel 51, the process returns to the step S10 to scan the capacitive touch panel 51 again. If the controller 52 determines that there is liquid on the capacitive touch panel 51, the process proceeds to the step S12.

In the step S12, the controller 52 determines the type of the liquid on the capacitive touch panel 51. After the controller 52 identified the type of the liquid, the process proceeds to the step S13. In the step S13, the controller 52 determines a scanning strategy according to the type of the liquid. The frequency of the periodical signal Sp used in different scanning strategies may also vary.

After the controller 52 determines the scanning strategy, the process proceeds to the step S14. In the step S14, the controller 52 activates the signal source 53 according to the scanning strategy determined in the step S13, causing the signal source 53 to provide a periodical signal Sp to the high-voltage terminal 522 of the controller 52 or to both the high-voltage terminal 522 and the low-voltage terminal 524 of the controller 52.

After the step S14, the controller 52 executes the step S15 to scan the capacitive touch panel 51 to generate second touch sensing information. The second touch sensing information includes the sensing values of a plurality of electrodes of the capacitive touch panel 51. The scanning performed in the step S15 does not apply driving signals to the capacitive touch panel 51 but only senses all the electrodes of the capacitive touch panel 51. The high-voltage terminal 522 and the low-voltage terminal 524, which provide power to the controller 52, are simultaneously applied with the periodical signal Sp, causing the potential of the electrodes to be sensed in the capacitive touch panel 51 to change periodically as well. Since the user is equivalent to another grounding terminal, when the finger of the user contacts the capacitive touch panel 51, a portion of the charge of the electrode corresponding to the contact position is taken away. Even without applying a driving signal to the capacitive touch panel 51, the contact position of a finger can still be determined based on the results obtained from sensing all the electrodes. During the scanning process in the step S15, at positions where no finger is in contact, the periodical signal Sp is present at both the high-voltage terminal 522 and the low-voltage terminal 524 simultaneously. As a result, the periodical signal Sp does not affect the sensing values of the electrodes at non-contact positions. At the position where the finger is in contact, since the human body can be regarded as another grounding terminal GND2, it is equivalent to the signal source 53 providing the periodical signal Sp to the finger of the user, as shown by the signal source 13 in FIG. 4. Since the frequency of the periodical signal Sp is determined according to the type of liquid, the controller 52 can correctly determine the contact position of the finger 20 according to the second touch sensing information without being affected by the liquid 21.

In the step S15, when the continuous activation time of the signal source 53 reaches a preset value or the number of the scans reaches a preset value, the controller 52 executes the step S16 to turn off the signal source 53, then the process returns to the step S10.

Figure 8:
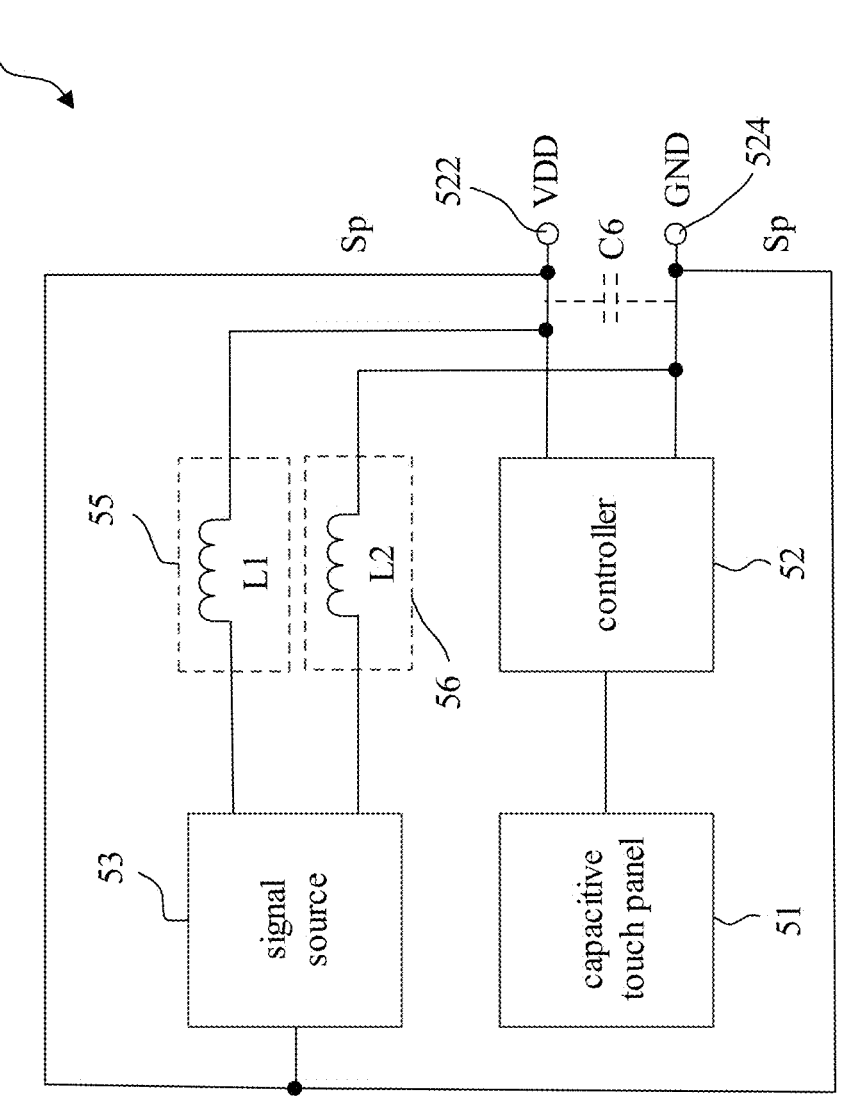
FIG. 8 is a diagram schematically showing an embodiment where the signal source and the controller in FIG. 7 share a power source.

The signal source 53 of FIG. 7 can share the power supply with the controller 52 as shown in the embodiment in FIG. 8. In comparison with the touch sensing system 50 in FIG. 7, the touch sensing system 50 in FIG. 8 further comprises a first filter 55 and a second filter 56. The first filter 56 includes, but is not limited to, an inductor L1. The second filter includes, but is not limited to, an inductor L2. The first filter 55 is coupled between the high-voltage terminal 522 and the signal source 53. The second filter 56 is coupled between the low-voltage terminal 524 and the signal source 53. The first filter 55 is used to prevent the periodical signal Sp from feeding back from the high-voltage terminal 522 to the signal source 53. The second filter 56 is used to prevent the periodical signal Sp from feeding back from the low-voltage terminal 524 to the signal source 53. In one embodiment, when the high-voltage terminal 522 and the low-voltage terminal are sufficiently close to each other, the signal source 53 may provide the periodical signal Sp only to the high-voltage terminal 522. The periodical signal Sp on the high-voltage terminal 522 can be coupled to the low-voltage terminal 524 through a coupling capacitor C6, thereby the second filter 56 can be omitted.

From the operation of the embodiment shown in FIG. 7 above, it can be understood that the control method of the touch sensing system 50 comprises:

A. providing a periodical signal Sp to the high-voltage terminal 522 of the controller 52 or to both the high-voltage terminal 522 and the low-voltage terminal 524 of the controller 52; and B. scanning the capacitive touch panel 51 by the controller 52 to generate touch sensing information, wherein the controller 52 does not apply a driving signal to the capacitive touch panel 51 in the Step B.

Regarding the details of the controller 52 executing the steps S10 to S12 in FIG. 1, reference can be made to the description of FIG. 1 mentioned earlier, and thus they will not be elaborated here.

The embodiment described in FIG. 2 above involves coupling the periodic signal Sp to the user when liquid is present on the surface of the capacitive touch panel 11, and then proceeding to perform step S15 of FIG. 1 Similarly, the embodiment in FIG. 7 also involves providing the periodic signal Sp to the high-voltage terminal 522 of the controller 52, or to both the high-voltage terminal 522 and the low-voltage terminal 524 of the controller 52, when liquid is present on the surface of the capacitive touch panel 51. However, the present invention is not limited to this configuration. In other embodiments, the capacitive touch panel is applied in scenarios where liquid is likely to present, such as rainy conditions or maritime environments. Even if there is no liquid on the surface of the capacitive touch panel, the steps S13 to S15 or the steps S14 to S15 of FIG. 1 can still be directly executed. In other words, it is possible to omit the steps S10 to S13 and the step S16 in FIG. 1.

The step S15 only senses all the electrodes of the capacitive touch panel. As described in the abovementioned embodiments, the capacitive touch panel includes m electrodes in the X direction and n electrodes in the Y direction. The scanning result obtained in the step S15 includes the sensing value of each electrode, that is, min sensing values. The contact position of the finger can be calculated according to the m+n sensing values.

The embodiments described above are only to exemplify the present invention but not to limit the scope of the present invention. Through making some modification or variation according to the technical contents disclosed in the specification and claims, any person having ordinary knowledge of the art should be able to generate equivalent embodiments without departing from the present invention. Further, the equivalent embodiments are to be included by the scope of the present invention.

What is claimed is:

1. A touch sensing system, comprising:
a capacitive touch panel;
a controller, coupled to with the capacitive touch panel and configured to scan the capacitive touch panel; and
a signal source, configured to provide a periodical signal for coupling to a user, such that the periodical signal can be coupled to the capacitive touch panel via the user;
wherein, when the signal source is activated to provide the periodical signal, the controller does not apply driving signals to the capacitive touch panel but only senses all electrodes of the capacitive touch panel.

2. The touch sensing system according to claim 1 further comprising a conductor coupled to the signal source and configured to contact with the user.

3. The touch sensing system according to claim 1 further comprising an antenna coupled to the signal source and configured to couple the periodical signal to the user.

4. The touch sensing system according to claim 1, wherein the capacitive touch panel includes a first electrode and a second electrode, wherein the first electrode is located in a first edge region of the capacitive touch panel, wherein the second electrode is located in a second edge region of the capacitive touch panel, wherein the first edge region adjacent to the second edge region, wherein the first electrode is perpendicular to the second electrode, wherein the signal source is connected to the first electrode during a first time interval, and wherein the signal source is connected to the second electrode during a second time interval which is after the first time interval.

5. The touch sensing system according to claim 1, wherein the signal source includes:

an oscillator, configured to generate an oscillation signal; and a booster circuit, coupled to the oscillator and used to boost the oscillation signal to generate the periodical signal.

6. The touch sensing system according to claim 1, wherein the controller is coupled to the signal source, and wherein the controller activates the signal source when liquid is present on a surface of the capacitive touch panel.

7. The touch sensing system according to claim 6, wherein the periodical signal provided by the signal source has a frequency ranging from 1.2 MHz to 2 MHz when the liquid is water.

8. The touch sensing system according to claim 6, wherein the periodical signal provided by the signal source has a frequency ranging from 10 MHz to 100 MHz when the liquid is saline.

9. The touch sensing system according to claim 6, wherein the controller performs a first mutual-capacitance scan on the capacitive touch panel with a driving signal having a first frequency to generate a first mutual-capacitance sensing information, wherein the controller performs a second mutual-capacitance scan on the capacitive touch panel with a driving signal having a second frequency to generate a second mutual-capacitance sensing information, wherein the first frequency is different from the second frequency, and wherein the controller determines whether the liquid is water or saline according to the first mutual-capacitance sensing information and the second mutual-capacitance sensing information.

10. A touch sensing system comprising:

a capacitive touch panel;

a controller, coupled to the capacitive touch panel and configured to scan the capacitive touch panel, wherein the controller has a high-voltage terminal and a low-voltage terminal, and wherein a combination of the high-voltage terminal and the low-voltage terminal is configured to provide power to the controller; and a signal source, configured to provide a periodical signal to the high-voltage terminal or to both the high-voltage terminal and the low-voltage terminal.

11. The touch sensing system according to claim 10, wherein the signal source includes:

an oscillator, configured to generate an oscillation signal; and a booster circuit, coupled to the oscillator and configured to boost the oscillation signal to generate the periodical signal.

12. The touch sensing system according to claim 10 further comprising a first filter coupled between the high-voltage terminal and the signal source and configured to prevent the periodical signal from feeding back from the high-voltage terminal to the signal source.

13. The touch sensing system according to claim 10, wherein the signal source is controlled by the controller, and the controller activates the signal source when liquid is present on a surface of the capacitive touch panel.

14. The touch sensing system according to claim 13, wherein the periodical signal provided by the signal source has a frequency ranging from 1.2 MHz to 2 MHz when the liquid is water.

15. The touch sensing system according to claim 13, wherein the periodical signal provided by the signal source has a frequency ranging from 10 MHz to 100 MHz when the liquid is saline.

16. The touch sensing system according to claim 13, wherein the controller performs a first mutual-capacitance scan on the capacitive touch panel with a driving signal having a first frequency to generate a first mutual-capacitance sensing information, wherein the controller performs a second mutual-capacitance scan on the capacitive touch panel with a driving signal having a second frequency to generate a second mutual-capacitance sensing information, wherein the first frequency is different from the second frequency, and wherein the controller determines whether the liquid is water or saline according to the first mutual-capacitance sensing information and the second mutual-capacitance sensing information.

17. A control method of a touch sensing system, wherein the touch sensing system includes a capacitive touch panel and a controller, the controller is coupled to the capacitive touch panel and has a high-voltage terminal and a low-voltage terminal, a combination of the high-voltage terminal and the low-voltage terminal is configured to provide power to the controller, the control method comprising:

A. providing a periodical signal to the high-voltage terminal of the controller or to both the high-voltage terminal and the low-voltage terminal of the controller; and B. scanning the capacitive touch panel by the controller.

18. The control method according to claim 17, wherein the step A is performed only when liquid is present on a surface of the capacitive touch panel.

19. The control method according to claim 18, wherein the periodical signal has a frequency ranging from 1.2 MHz to 2 MHz when the liquid is water.

20. The control method according to claim 18, wherein the periodical signal has a frequency ranging from 10 MHz to 100 MHz when the liquid is saline.

21. The control method according to claim 20, wherein a step of determining that the liquid is saline comprises:

using a driving signal having a first frequency to perform a first mutual-capacitance scan on the capacitive touch panel to generate first mutual-capacitance sensing information;

using a driving signal having a second frequency to perform a second mutual-capacitance scan on the capacitive touch panel to generate second mutual-capacitance sensing information; and determining that the liquid is saline according to the first mutual-capacitance sensing information and the second mutual-capacitance sensing information.

22. A control method of a touch sensing system, the touch sensing system includes a capacitive touch panel and a controller, the control method comprising:

A. coupling a periodical signal to a user such that the periodical signal can be coupled to the capacitive touch panel via the user; and B. scanning the capacitive touch panel;

wherein, the scanning performed in the step B does not apply driving signals to the capacitive touch panel but only senses all electrodes of the capacitive touch panel.

23. The control method according to claim 22, wherein the step A is executed only when liquid is present on a surface of the capacitive touch panel.

24. The control method according to claim 23, wherein the periodical signal has a frequency ranging from 1.2 MHz to 2 MHz when the liquid is water.

25. The control method according to claim 23, wherein the periodical signal has a frequency ranging from 10 MHz to 100 MHz when the liquid is saline.

26. The control method according to claim 25, wherein a step of determining that the liquid is saline comprises:

using a driving signal having a first frequency to perform a first mutual-capacitance scan on the capacitive touch panel to generate first mutual-capacitance sensing information;

using a driving signal having a second frequency to perform a second mutual-capacitance scan on the capacitive touch panel to generate second mutual-capacitance sensing information; and determining that the liquid is saline according to the first mutual-capacitance sensing information and the second mutual-capacitance sensing information.

* * * * *